(12) United States Patent
Miura

(10) Patent No.: US 9,444,261 B2
(45) Date of Patent: Sep. 13, 2016

(54) POWER LINE COMMUNICATION DEVICE

(71) Applicant: Takeshi Miura, Hirosaki (JP)

(72) Inventor: Takeshi Miura, Hirosaki (JP)

( * ) Notice: Subject to any disclaimer, the term of this patent is extended or adjusted under 35 U.S.C. 154(b) by 746 days.

(21) Appl. No.: 13/860,088

(22) Filed: Apr. 10, 2013

(65) Prior Publication Data

US 2013/0293001 A1    Nov. 7, 2013

(30) Foreign Application Priority Data

Apr. 11, 2012   (JP) .................................. 2012-90161

(51) Int. Cl.
*H02J 4/00* (2006.01)
*H04B 3/54* (2006.01)

(52) U.S. Cl.
CPC . *H02J 4/00* (2013.01); *H04B 3/54* (2013.01); *H04B 3/542* (2013.01); *H04B 2203/5408* (2013.01)

(58) Field of Classification Search
CPC ........... H02J 4/00; H04B 3/54; H04B 3/542; H04B 2203/5408
See application file for complete search history.

(56) References Cited

U.S. PATENT DOCUMENTS

| 4,589,120 | A | * | 5/1986 | Mendala | ............... | H04L 1/0083 |
| | | | | | | 340/12.37 |
| 4,667,193 | A | * | 5/1987 | Cotie | ..................... | G06F 13/22 |
| | | | | | | 340/10.32 |
| 5,017,837 | A | * | 5/1991 | Hanna | ..................... | G08B 5/36 |
| | | | | | | 315/119 |
| 5,051,720 | A | * | 9/1991 | Kittirutsunetorn | ... | G06F 1/3209 |
| | | | | | | 340/12.33 |
| 5,782,036 | A | * | 7/1998 | Bertieri | ................... | E05F 15/77 |
| | | | | | | 49/25 |

FOREIGN PATENT DOCUMENTS

| JP | 1981-111206 | 6/1989 |
| JP | 2003-162765 | 6/2004 |
| JP | 2005-313409 | 10/2005 |
| JP | 2005-334684 | 11/2005 |
| JP | 2005-296190 | 4/2007 |
| JP | 2007-317239 | 6/2009 |
| JP | 2011-234064 | 11/2011 |

\* cited by examiner

*Primary Examiner* — Zeev V Kitov
(74) *Attorney, Agent, or Firm* — U.S. Fairsky LLP; Robert Yue Xu

(57) ABSTRACT

A power line communication device that will control multiple sub-units without exception via broadcasting from a main unit is disclosed. The power line communication device controls the machines connected to each sub-unit from a main unit using power line communication. The power line communication device has a controller, a main unit superimposing control signals containing data from said controller onto the power line, and multiple sub-units controlling the connected machines by receiving control signals being broadcast from the main unit. Each sub-unit is set up to be capable of data transfer, and it is possible to initiate data transfers from the main unit or selected sub-units.

2 Claims, 6 Drawing Sheets

POWER LINE COMMUNICATION DEVICE

CLAIM OF PRIORITY

This application claims priority from Japanese patent application No. 2012-90161 filed on Apr. 11, 2012, the entire content of which is hereby incorporated by reference into this application.

TECHNOLOGICAL FIELD

This invention is about a power line communication (PLC) device, in particular, a power line communication device suitable for the illumination, extinguishing, and brightness adjustment of lighting equipment through controllers such as computers, etc. from a main unit to a sub-unit.

BACKGROUND TECHNOLOGY

Generally, in power line communication (PLC) or power line carrier communication, there is bidirectional communication by means of a handshaking method between the main unit and a sub-unit, where the main unit verifies data received from the sub-unit without fail and communication is determined to have been successful when the main unit accepts the data.

A prior disclosed example of lighting equipment control via power line communication is listed in Japanese Published Unexamined Application No. 2011-234064. In this exceptional prior example, the main unit of control establishes no bidirectional communication with individual sub-units when using a machine (node) capable of power line carrier communication to remotely control a sub-unit installed on a node, by superimposing control signals from a transceiver acting as main unit onto the power line. The main unit transmits commands by constantly sending out only broadcast signals to the grouped sub-units capable of power line communication. Here, it is stated that the unique ID number of each sub-unit is recorded in the power line carrier communication microcomputer.

PRIOR ART DOCUMENTS

Patent Documents

[Patent document 1] Japanese Published Unexamined Application No. 2011-234064

SUMMARY OF THE INVENTION

Problems to be Resolved by the Invention

In the aforementioned prior example, when receiving data from the main unit, a sub-unit may sometimes not be able to directly capture signals from the main unit due to its distant location or high-frequency noises emitted by machines connected to the power line. As such, there is a limited number of machines (nodes) the main unit can directly send data to via a broadcast. Therefore, in the case where the intention is to control multiple sub-units, there may be some that cannot be controlled for the reasons described above.

Additionally, while the aforementioned invention of the prior example describes a power line communication illumination control method using broadcasting, it does not touch on physical communication connectivity. Using broadcasting alone limits the number of controllable sub-unit machines (nodes) to a restricted range. As a result, the installation site of the main unit has to be devised in such a way that it is located in the middle of all machines (nodes), which is unrealistic.

Hence, the purpose of this invention is to provide a power line communication device capable of controlling multiple sub-units without omission via broadcasting (simultaneous transmission), without employing a sub-unit to main unit handshaking method.

Means of Solving the Problems

This invention is a power line communication device that controls the various machines connected to individual sub-units through a main unit using power line communication by means of broadcasting. The device has a controller, a main unit superimposing control signals containing data from said controller onto the power line, and multiple sub-units controlling the connected machines by receiving control signals being broadcast from said main unit. Each sub-unit is set up to be capable of data transfer. This invention is characterized by its ability to initiate data transfers from the main unit or selected sub-units.

Advantageous Effect of the Invention

This invention provides a power line communication device that can control multiple sub-units without exception via broadcasting from a main unit.

MODES FOR CARRYING OUT THE INVENTION

The power line communication device of this invention controls the various machines connected to individual sub-units through a main unit using power line communication by means of broadcasting. The power line communication device has a controller (PC, etc.), a main unit superimposing control signals containing data from said controller onto the power line, and multiple sub-units controlling the connected machines by receiving control signals broadcast from said main unit. Each sub-unit is set up to be capable of to carrying out data transfers either from the main unit or selected sub-units.

WORKING EXAMPLE 1

Generally, the main unit will usually be situated near a computer power source, etc. where many connected sockets emitting large amounts of noises also reside. As a result, signals from the main unit are often unable to be received over power line communication. In order to use the main unit to accurately control, for example, lighting equipment (for example, LED indicators, LED fluorescent lamps, LED lighting devices, etc.) through a sub-unit to carry out illumination, extinguishing, or brightness adjustment, verification that the sub-unit has received data from the main unit will be carried out by the operator visually ascertaining the lighting up or flickering of an LED lamp, instead of the main unit doing so by waiting to receive reply signals from the sub-unit. This LED lamp can either be an ON/OFF unit in the power socket capable of power line communication, or an installed indicator such as an LED, etc.

Figure 1:
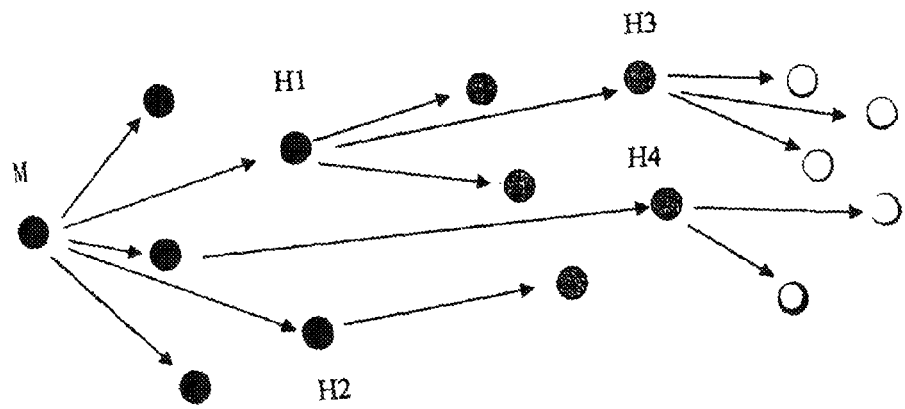
FIG. 1 Diagrammatic illustration explaining the fundamental concept of this invention.
Figure 2:
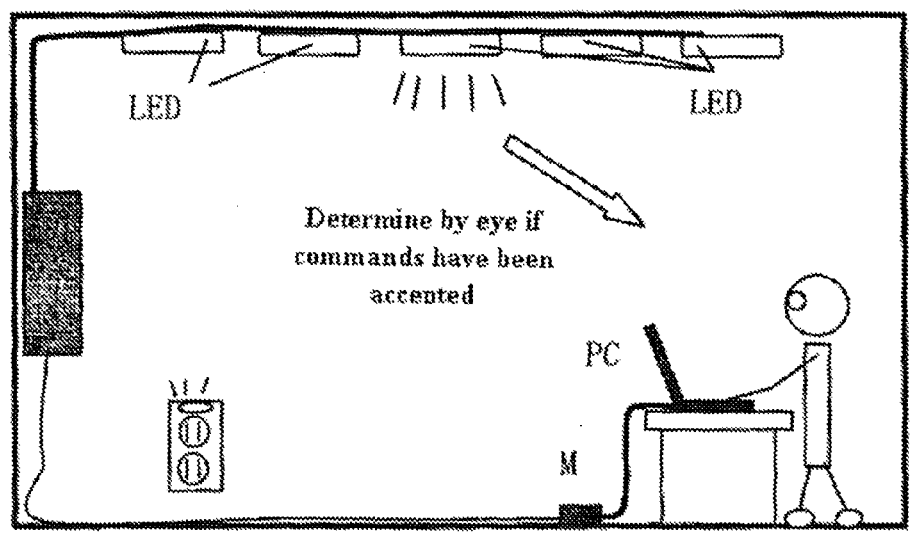
FIG. 2 Indoor layout plan of this invention's power line communication device taking lighting equipment (LED, etc.) as an example.

This invention was based on the technological thought of the aforementioned. The working example of the invention will be explained with references to FIGS. 1 to 8 below, using the illumination, extiguishing, and brightness adjustment etc. of lighting equipment as an example. First of all, the basic concept of this invention will be explained using FIGS. 1 and 2. When the data being emitted from main unit M reaches sub-unit H1, the lighting equipment being controlled by the sub-unit is set up to illuminate or blink. If the data being emitted from main unit M (left) reaches the black circle sub-units (H1, H2, etc.), the lighting equipment (indicators such as LED, etc.) illuminates, or illuminates intermittently (blinks) as an indication, which the operator manipulating the main unit can ascertain visually. At this time, if the gray circle and white circle sub-units do not illuminate or blink, the operator can ascertain that the data has not reached these sub-units.

Next, in order to send the data from main unit M to the gray circle sub-units from the black circle sub-units, main unit M selects sub-units H1 and H2 from among the black circle sub-units and instructs them to do a data transfer. When main unit M issues the control command for that instruction, the indicators (LED, etc.) assigned to the nodes of sub-units H1 and H2 will illuminate or blink several times for the operator controlling the main unit to ascertain that the control command has been received. Similarly, to extend the control range from the gray circle sub-units to the white circle sub-units, the main unit will instruct sub-units H3 and H4 to do a data transfer. Once sub-units H3 and H4 receive instructions from main unit M, the indicators illuminate or blink for the operator controlling the main unit to ascertain that the instructions have been received.

Figure 3:
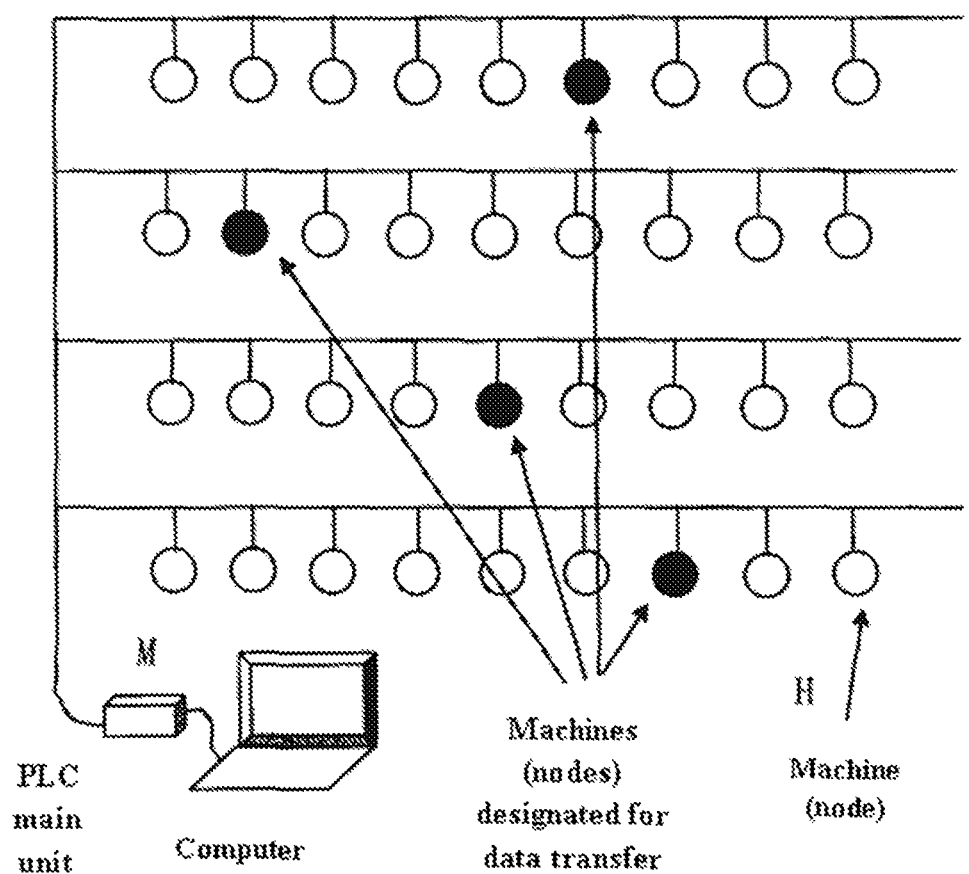
FIG. 3 Diagram showing the arrangement of main unit and sub-units of the power line communication device.

This method is a one-way communication from the main unit to the sub-units where the vice versa does not take place. If all machines (nodes) retransmit (forward) data received from the main unit, communication traffic within the power line increases, and if data retrieval time exceeds a predetermined time-out period, communication may even fail. Thus, as indicated in FIG. 3, the machine (node) retransmitting data can be designated by the main unit. The operator evaluates the range limit of the signals and designates the sub-units for retransmission. The overall wiring of the computer controlling the main unit, main unit M and sub-units H is shown schematically here in FIG. 3. The machines (sub-units) shown as black circles have been designated for data transfer.

Figure 4:
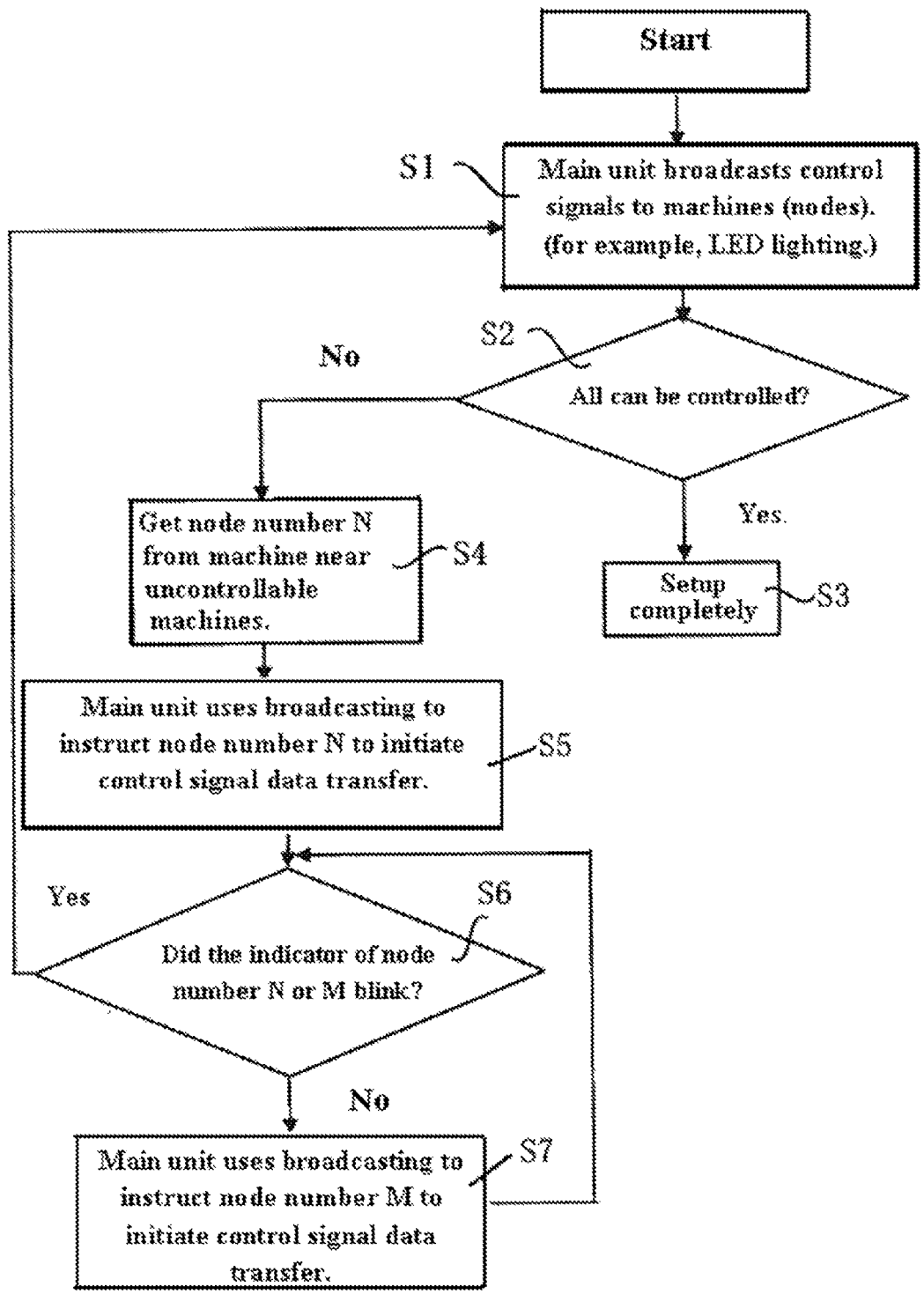
FIG. 4 Flow chart of power line communication data transfer setting.

Next, the data transfer setup flow chart referenced in FIG. 4 will be explained. First of all, the signals to be sent to the sub-units as visual verification for the operator are preconfigured to be either blink or illuminate signals. Control signals are sent to sub-unit machines (nodes) via broadcasting (Step S1). The operator ascertains if all sub-units are controllable using visual verification (Step S2). If it is ascertained that all sub-units are controllable, the setup is complete (Step S3). As a result, the main unit is in the condition to carry out lighting equipment illumination, extinguishing, and brightness adjustment by broadcasting to all sub-units. If the operator determines that not all sub-units are controllable during the visual verification, node number N (for example, the ID numbers of sub-units H1 and H2 explained in connection with FIG. 1) of a machine near the uncontrollable machine is obtained (Step S4). Next, the operator broadcasts control signals from the main unit instructing Node N to transfer data (Step S5). The operator visually verifies whether the indicator of node number N or M (for example, the ID numbers of sub-unit H3 and H4 explained in connection with FIG. 1) has blinked or illuminated (Step S6). If it has blinked or illuminated, return to Step S1. Or, if it does not blink, the operator broadcasts control signals from the main unit instructing Node M to transfer data (Step S7). Repeat until all indicators flicker or are lighted up, and return to Step S1. In another example, when there are uncontrollable sub-units, one or more controllable sub-units near the uncontrollable sub-units are selected for data transfer, wherein the selection is made based on the aforementioned ID numbers of the subunits. The selected sub-units are instructed to send out control signals via broadcasting. If there are still uncontrollable sub-units, additional controllable sub-units near the uncontrollable subunits are once again selected for data transfer using the aforementioned ID numbers, and these sub-units are instructed to send out control signals via broadcasting. This process is repeated until all sub-units are controllable, characteristic of this power line communication device.

As mentioned above, when the data transfer setup is complete, the main unit will be in a condition to communicate data to all sub-units. When the main unit is able to broadcast data to sub-units, it becomes capable of illuminating, extinguishing, and adjusting the brightness, etc. of all lighting equipment connected to a sub-unit. For example, it is able to light up, extinguish, or adjust the brightness of all or some of the lighting equipment at once.

Figure 5:
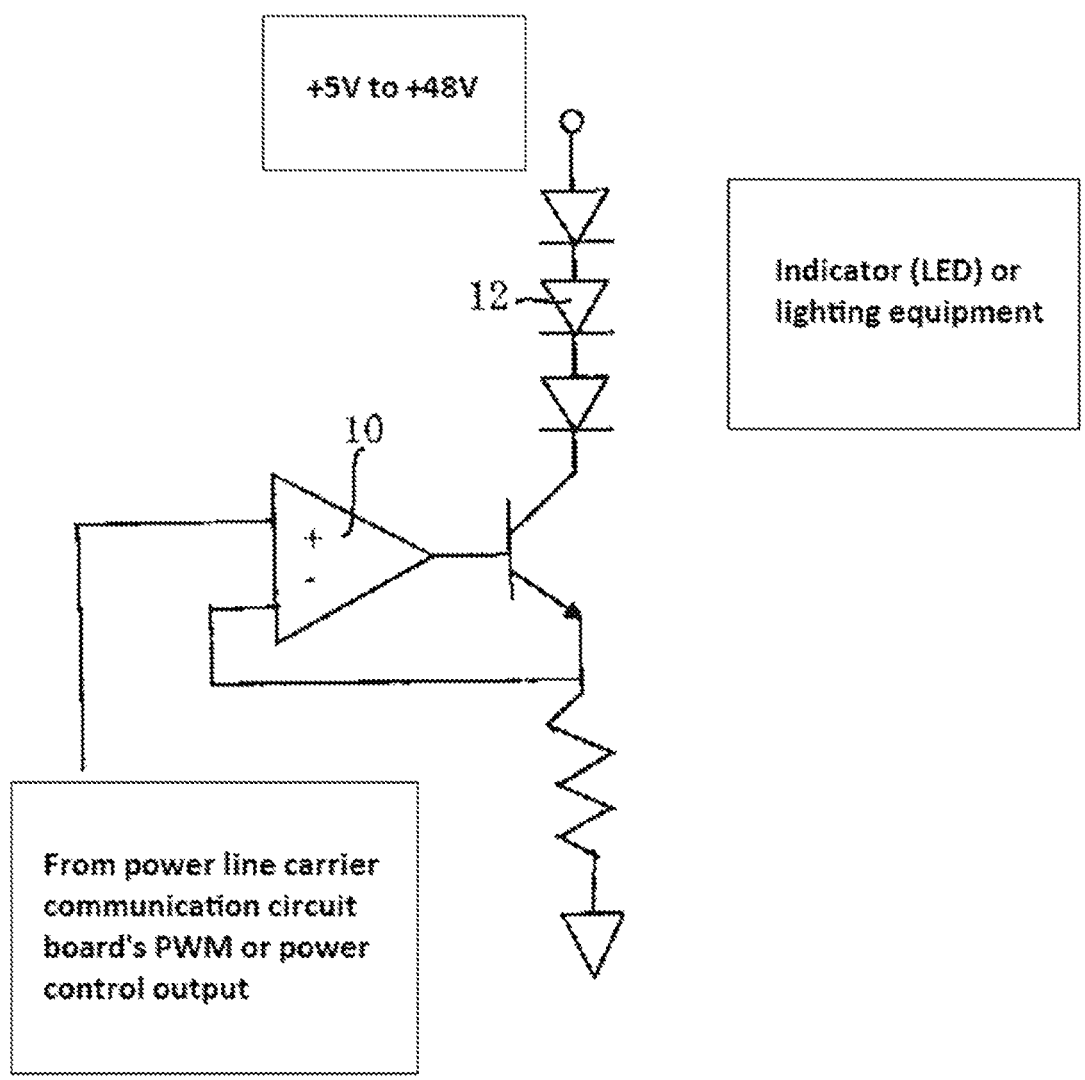
FIG. 5 Circuit diagram showing the illumination circuit of the lighting equipment.

Next, the circuitry of the indicator or lighting equipment will be explained with reference to FIG. 5. When power line carrier communication signals (PWM or voltage control signals) are input into Op Amp 10, an electrical current from the power source (+5V or +48V) flows to indicator 12, for example, three units of series-connected LED, which illuminates. The illumination, extinguishing, or brightness adjustment, etc. of the indicator is carried out depending on the type of signals that were input.

Figure 6:
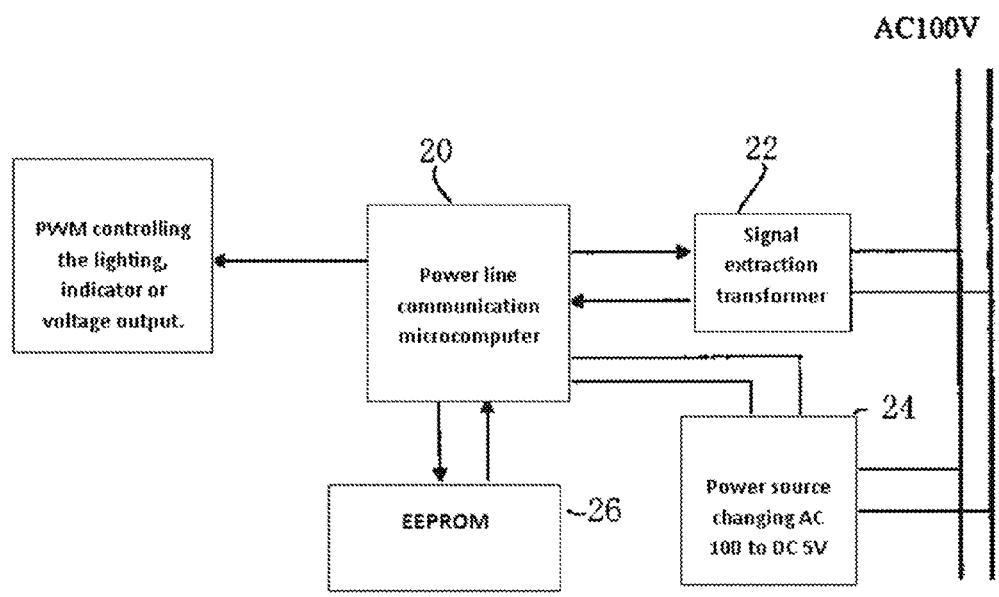
FIG. 6 Block diagram of a sub-unit.

Next, the module configuration of the sub-unit's power line communication will be explained in reference to FIG. 6. A signal extraction transformer 22 is inserted between the power line communication microcomputer 20, for example, Renesas Electronics Corporation's M16C/6S1, and a commercially available alternating current (AC) 100V (or 200V). The output level of microcomputer 20 is around 1V P-P, and signals modulated by a spread spectrum method between frequencies of 100 KHz to 400 KHz are output. These signals are injected into the alternating current (AC100V) line via signal extraction transformer 22.

Also, signals from other sub-units existing on the AC100V line will be extracted from within the AC100V through this signal extraction transformer 22, and directed to the input terminal of power line communication microcomputer 20. Power line communication microcomputer 20 requires direct current (DC) 5V, which is supplied to power line communication microcomputer 20 by power supply 24 converting AC100V to DC5V. Each power line communication module needs a unique ID number. This information is stored in advance in EEPROM 26.

Figure 7:
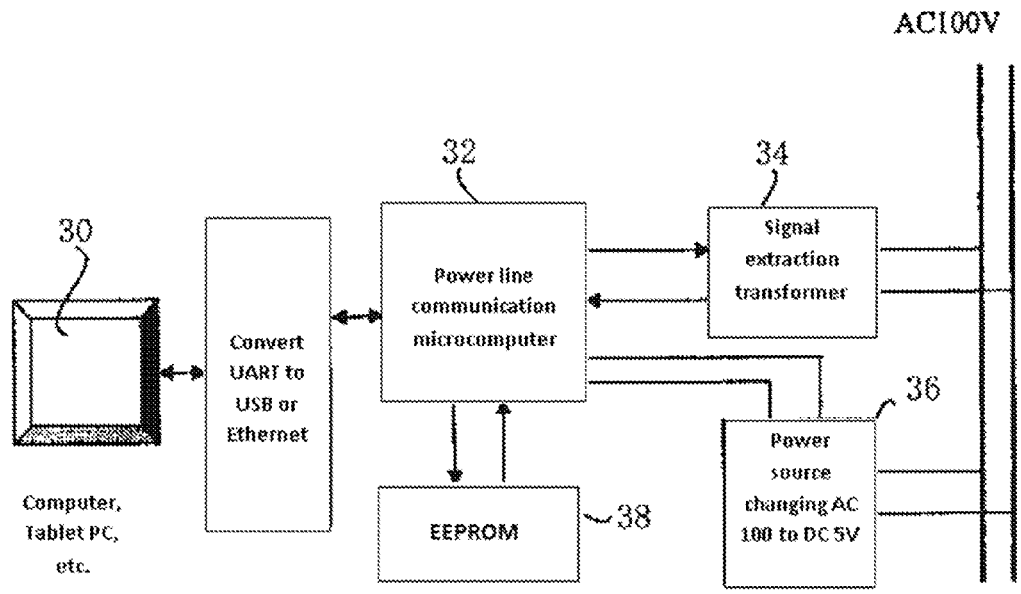
FIG. 7 Block diagram of a main unit.

Next, the main unit's power line communication module setup will be explained in reference to FIG. 7. The power line communication microcomputer 32, signal extraction transformer 34, and power supply 36 or EEPROM 38 on the main unit's power line communication module are the same as the power line communication microcomputer 20, signal extraction transformer 22, and power supply 24 or EEPROM 26 on the sub-unit's power line communication module. When sending signals to a sub-unit's power line communication module with a designated ID number from computer 30, the output command from computer 30 is sent to power line communication microcomputer 20 (FIG. 6) via USB or Ethernet. Power line communication microcomputer 20 generates modulated signals using a method like spread spectrum and outputs them to signal extraction transformer 22.

Each machine has a network ID and an individual machine address ID. For example, when controlling 100 nodes from one main unit in a building, the 101 power line machines all have the same network ID number. The 100 nodes each have a separate node ID number. If a particular node ID is flagged with transfer permission, that machine transmits the same data it has received on the power line. At the same time, when setting up the data transfer, the indicator is made to blink or illuminate. After the setup, the indicator is illuminated, extinguished, adjusted in brightness, etc.

Figure 8:
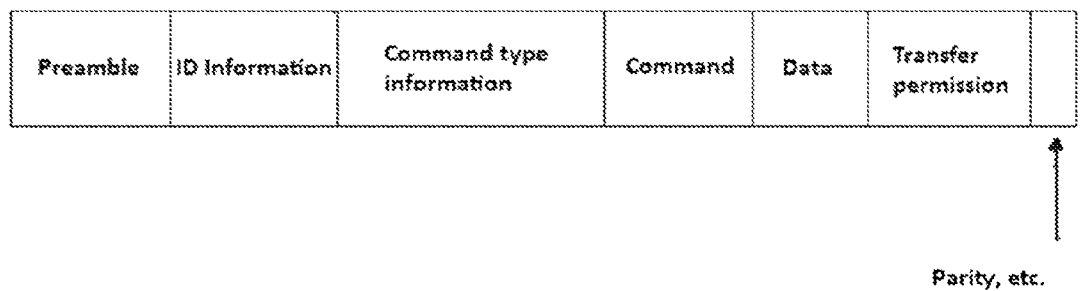
FIG. 8 Diagram showing the packet's configuration.

Next, the signal packet used to transmit communications from the main unit to sub-units and from sub-units to sub-units is shown in FIG. 8. The packet consists of preamble, ID information, command type information, commands, data, transfer permission, parity etc. Also, each node makes a visual display that it has accepted this data by causing its indicator to blink if, for example, there are changes to its current settings, like if the LED fluorescent light is to be made dimmer, etc. ID information is made up of a network ID and an address ID.

(Other Working Examples.)Additionally, attaching an indicator like an LED to a power outlet enables it to have a similar function. Also, this invention can be used to make multiple speakers give out sounds using broadcasting as well. In such cases, verification will be audio rather than visual.

(Working Example.)When illuminating and extinguishing 100 1200 mm 21W LED fluorescent bulbs via a main unit, 50 were controllable, but the other 50 were not. By instructing 2 or 3 bulbs among those that had lighted up to do a data transfer, all 100 bulbs became controllable. The sub-units connected to the LED fluorescent bulbs closest to the uncontrollable LED fluorescent bulbs were chosen to transmit this data via a visual check. The sub-units connected to the LED fluorescent bulbs chosen to transmit data made a visual indication to the operator that they had received the commands by blinking around 3 times every 0.5 seconds. The LED fluorescent bulb can illuminate and extinguish, carrying out at least three or more steps of light modulation after receiving signals from the main unit. Also, the LED's brightness level could be specified according to instructions sent out by the main unit when the system is initially set up with a 100v or 200v etc. power source. This invention can control all machines (nodes) via data transfer no matter where the main unit may be located.

SYMBOL EXPLANATION

M Main unit
H, H1, H2, H3, H4 Sub units
10 Op Amp
12 LED
20 Power line communication microcomputer
22 Signal extraction transformer
24 Power supply
26 EEPROM
30 Computer
32 Power line communication microcomputer
34 Signal extraction transformer
36 Power supply
38 EEPROM

What is claimed is:

1. A power line communication device for controlling multiple machines connected to individual sub-units, said sub-units being controlled by a main unit using power line communication by means of broadcasting, comprising:
   a controller;
   one or more main units capable of superimposing control signals containing data from said controller onto the power line;
   multiple sub-units capable of controlling connected machines by receiving control signals broadcast from said main unit;
   a means of determination that informs an operator when said sub-units connected to the machines have received control signals; and,
   wherein each sub-unit is set up to be capable of carrying out data transfers either from the main unit or selected sub-units,
   said sub-units have ID numbers that differentiate each sub-unit; and
   said power line communication device is able to designate using an ID number a selected sub-unit to carry out data transfer based on said means of determination during data transfer setup
   the data transfer setup is such that a main unit transmits control signals to all sub-units via broadcasting;
   said means of determination is used on each sub-unit or each machine connected to said sub-unit to determine whether all sub-units are controllable;
   said power line communication device is adapted to execute the following steps:
   said main unit sends out control signals to sub-units via broadcasting;
   if there are uncontrollable sub-units, nearby controllable sub-units are selected for data transfer via said ID numbers, and these selected sub-units send out control signals via broadcasting;
   if there are still uncontrollable sub-units, once again nearby controllable sub-units are selected for data transfer using said ID numbers, and these selected sub-units send out control signals via broadcasting; and
   repeat until all sub-units are controllable.

2. The power line communication device of claim 1, wherein said means of determination includes illumination or blinking of either an indicator or light on said machine or said sub-unit.

* * * * *